(12) United States Patent
Patel et al.

(10) Patent No.: US 11,829,387 B2
(45) Date of Patent: Nov. 28, 2023

(54) SIMILARITY BASED DIGITAL ASSET MANAGEMENT

(71) Applicant: Kyndryl, Inc., Armonk, NY (US)

(72) Inventors: Pritesh Patel, Raleigh, NC (US);
Shikhar Kwatra, San Jose, CA (US);
Joseph Kozhaya, Morrisville, NC (US);
Anantha S. Rao, Cary, NC (US)

(73) Assignee: KYNDRYL, INC., New York, NY (US)

( * ) Notice: Subject to any disclaimer, the term of this patent is extended or adjusted under 35 U.S.C. 154(b) by 164 days.

(21) Appl. No.: 17/332,465

(22) Filed: May 27, 2021

(65) Prior Publication Data

US 2022/0382785 A1   Dec. 1, 2022

(51) Int. Cl.
*G06F 16/28* (2019.01)
*G06F 16/2457* (2019.01)

(52) U.S. Cl.
CPC ...... *G06F 16/285* (2019.01); *G06F 16/24575* (2019.01)

(58) Field of Classification Search
CPC .................. G06F 16/285; G06F 16/24575
See application file for complete search history.

(56) References Cited

U.S. PATENT DOCUMENTS

| | | | |
|---|---|---|---|
| 7,370,364 B2 | 5/2008 | Dobbins et al. | |
| 7,716,217 B2 | 5/2010 | Marston et al. | |
| 8,131,694 B2 * | 3/2012 | Bender | G06F 16/285 |
| | | | 707/705 |
| 8,463,815 B1 * | 6/2013 | Zoellner | G06F 16/14 |
| | | | 707/999.009 |
| 8,606,548 B2 | 12/2013 | Webster et al. | |
| 9,652,507 B2 * | 5/2017 | Frankel | H04L 51/224 |
| 10,089,378 B2 * | 10/2018 | Webster | G06F 16/285 |
| 10,095,768 B2 * | 10/2018 | Koeten | G06F 16/122 |
| 10,169,743 B2 | 1/2019 | Castel et al. | |
| 10,223,438 B1 * | 3/2019 | Xu | G06F 16/285 |
| 10,282,368 B2 * | 5/2019 | Larsen | G06F 16/954 |
| 10,282,426 B1 * | 5/2019 | Lerner | G06F 16/23 |
| 10,303,690 B1 * | 5/2019 | Todd | G06F 16/2457 |
| 10,628,460 B2 * | 4/2020 | Faitelson | G06F 16/285 |

(Continued)

FOREIGN PATENT DOCUMENTS

KR   101691853 B1   1/2017

OTHER PUBLICATIONS

Angrave et al., "HR and analytics: why HR is set to fail the big data challenge," Human Resource Management Journal, vol. 26, No. 1, 2016.

(Continued)

*Primary Examiner* — Mark E Hershley
(74) *Attorney, Agent, or Firm* — Dan Housley; Andrew M. Calderon; Calderon Safran & Cole, P.C.

(57) ABSTRACT

An asset stored on a storage device of a computer system is detected to be omitted from an asset-specific access policy. Using a utilization history of the asset, a criticality of the asset is scored, generating a first criticality score for the asset. Using the first criticality score, the asset is classified into a policy category. A selected access policy selected from a set of access policies assigned to a set of assets in the policy category is applied to the asset, the selected access policy specifying an access restriction of the asset.

20 Claims, 10 Drawing Sheets

(56) References Cited

U.S. PATENT DOCUMENTS

| | | | |
|---|---|---|---|
| 11,698,919 B2* | 7/2023 | Katz | G06F 9/544 |
| | | | 707/740 |
| 2006/0112130 A1 | 5/2006 | Lowson | |
| 2009/0199230 A1* | 8/2009 | Kumar | G06Q 30/0268 |
| | | | 725/32 |
| 2013/0073387 A1* | 3/2013 | Heath | G06Q 30/02 |
| | | | 705/14.53 |
| 2014/0173739 A1* | 6/2014 | Ahuja | G06F 21/568 |
| | | | 726/25 |
| 2014/0244631 A1 | 8/2014 | Arthur et al. | |
| 2016/0117770 A1 | 4/2016 | Graham | |
| 2016/0125451 A1* | 5/2016 | Garg | G06Q 30/0243 |
| | | | 705/14.42 |
| 2016/0359891 A1* | 12/2016 | Pang | G06F 16/285 |
| 2016/0364466 A1* | 12/2016 | Weborg, Jr. | G06F 16/211 |
| 2017/0154096 A1* | 6/2017 | Qiao | G06F 16/21 |
| 2018/0260471 A1* | 9/2018 | Ghimire | G06F 16/24578 |
| 2019/0251489 A1* | 8/2019 | Berti | G06F 16/1824 |
| 2020/0004759 A1* | 1/2020 | Brebner | G06F 8/10 |
| 2020/0201874 A1* | 6/2020 | Reehil | G06F 16/284 |
| 2020/0274895 A1* | 8/2020 | Kulaga | G06F 16/906 |
| 2020/0348662 A1* | 11/2020 | Cella | G05B 23/0286 |
| 2020/0358804 A1* | 11/2020 | Crabtree | H04L 63/1425 |
| 2021/0004391 A1* | 1/2021 | Ferreira, Jr. | G06F 16/285 |
| 2021/0136120 A1* | 5/2021 | Crabtree | G06F 16/9024 |
| 2021/0157312 A1* | 5/2021 | Cella | G01M 13/045 |
| 2021/0173711 A1* | 6/2021 | Crabtree | G06F 16/9024 |
| 2021/0294916 A1* | 9/2021 | Pham | G06F 21/6245 |
| 2021/0303645 A1* | 9/2021 | Anderson | G06F 16/9532 |
| 2021/0326797 A1* | 10/2021 | Harding | G06Q 10/06312 |
| 2021/0374163 A1* | 12/2021 | Wang | G06F 16/285 |
| 2022/0012268 A1* | 1/2022 | Ghoshal | G06F 16/285 |
| 2022/0035839 A1* | 2/2022 | Andres | G06Q 50/265 |
| 2022/0035840 A1* | 2/2022 | Nakayama | G08G 1/01 |
| 2022/0043836 A1* | 2/2022 | Upadhyay | G06N 5/04 |
| 2022/0107965 A1* | 4/2022 | Hamdi | G06F 16/285 |
| 2022/0343198 A1* | 10/2022 | Chopra | G06N 5/045 |
| 2022/0382785 A1* | 12/2022 | Patel | G06F 16/24575 |

OTHER PUBLICATIONS

Ward et al., The Development of Access Control Policies for Information Technology Systems, Computers & Security, vol. 21, No. 4, pp. 356-371, 2002.

Supaporn et al., "Enterprise Assets Security Requirements Construction from ESRMG Grammar based on Security Patterns", 14th Asia-Pacific Software Engineering Conference (APSEC'07), IEEE, 2007.

Franqueira et al. "External insider threat: A real security challenge in enterprise value webs.", 2010 International Conference on Availability, Reliability and Security, IEEE, 2010.

Sieg, "Text Similarities : Estimate the degree of similarity between two texts", Jul. 4, 2018, https://medium.com/@adriensieg/text-similarities-da019229c894.

\* cited by examiner

SIMILARITY BASED DIGITAL ASSET MANAGEMENT

BACKGROUND

The present invention relates generally to a method, system, and computer program product for digital asset management. More particularly, the present invention relates to a method, system, and computer program product for similarity based digital asset management.

A digital asset, or simply an asset, is a file or collection of files stored on a storage device of a computer system. Some examples of digital assets are text files, word processing files, spreadsheet files, presentation files, still image, video, and audio files, source code files, and the like.

In a typical enterprise environment, some users have their own repository of assets, stored locally or in a designated portion of a storage system accessible via a network. Some users, for example those on a project team, work together on a common asset or set of assets. As well, some users need both read and write access to an asset (e.g., those responsible for creating a policy document that will apply to all employees of a business) while others need only read access to the same asset (e.g. those responsible for implementing the policies in the policy document). multiple users often work together on one or more assets. Thus, each asset might be readable or writable by a single user, a group of users, or all the users.

SUMMARY

The illustrative embodiments provide a method, system, and computer program product. An embodiment includes a method that detects that an asset stored on a storage device of a computer system is omitted from an asset-specific access policy. An embodiment scores, using a utilization history of the asset, a criticality of the asset, the scoring comprising generating a first criticality score for the asset. An embodiment classifies, using the first criticality score, the asset into a policy category. An embodiment applies, to the asset, a selected access policy, the selected access policy selected from a set of access policies assigned to a set of assets in the policy category, the selected access policy specifying an access restriction of the asset.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
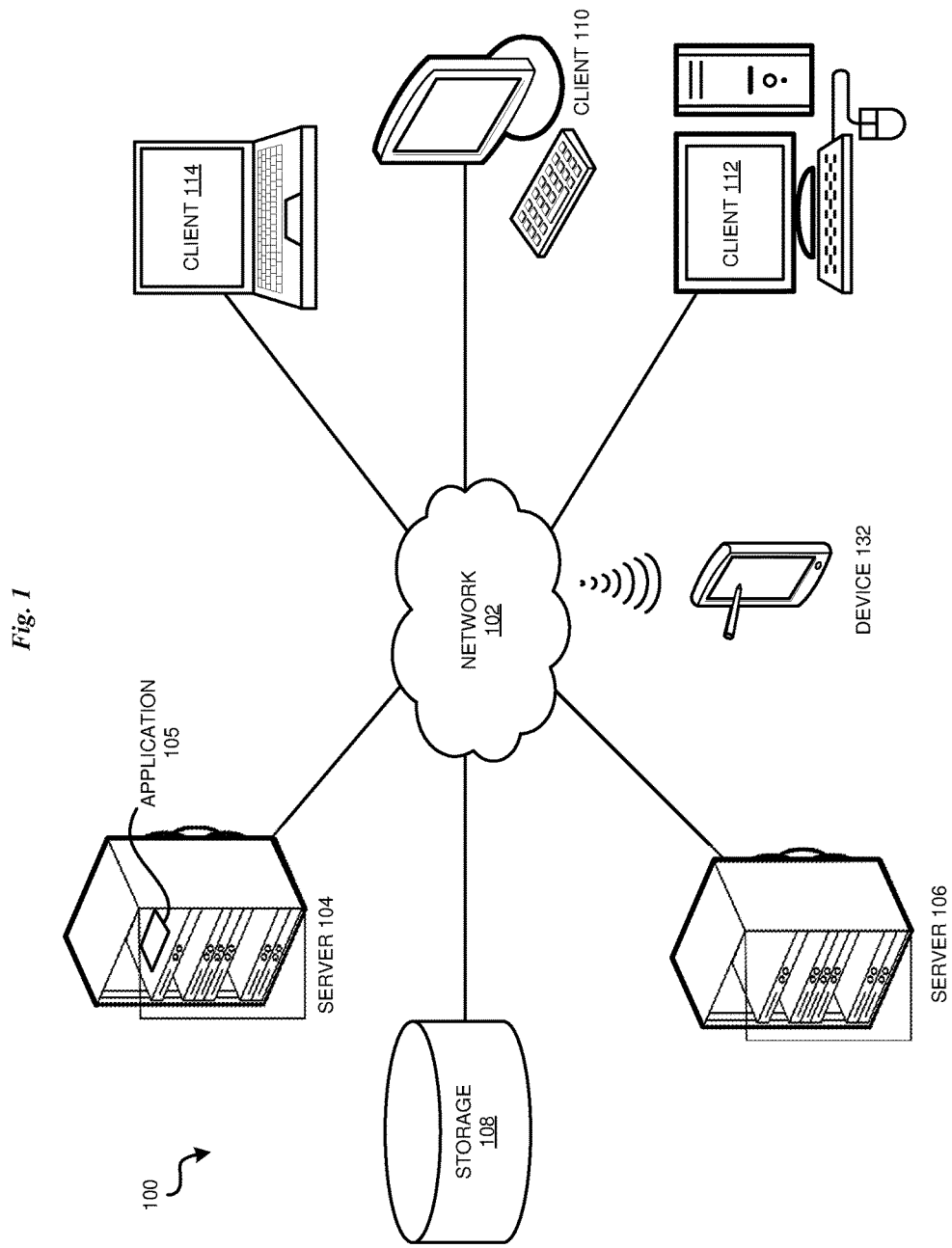
FIG. 1 depicts a block diagram of a network of data processing systems in which illustrative embodiments may be implemented.

The illustrative embodiments recognize that, in a multiple-user, multiple-asset environment, not all users should have access to, or be able to modify, each asset. For example, a spreadsheet containing salary information for a group of employees might be readable by their manager and modifiable by a human resources professional responsible for the manager's group, but not accessible to others within a business. As well, users' rights can change with time. For example, a document a group is using to plan a conference, including speaker and schedule information, might be modifiable by everyone in the group before the conference, but once the conference has occurred the document can be archived and no further changes made.

The illustrative embodiments also recognize that, to ensure that assets that are critical to a business' continued operations remain accessible in the event of a storage device failure, power failure within a particular data center, natural disaster, security breach, or other unexpected event, such assets are often backed up frequently and replicated in different locations. However, assets that are less important to a business' continued operations might not need to be backed up as frequently or in as many locations. An asset's storage location and criticality can also change over time. For example, a user might store the first draft of a new project specification in her private asset repository, then move the document to a group asset repository once a project team is assigned to implement the project, then move the document to a repository of production assets, with more frequent backups and additional replications, once the project goes into production.

However, users of an asset rarely generate an asset-specific access restriction, apply an access restriction consistently, or modify an access restriction or backup strategy as an asset's importance to the business, also called the asset's criticality, changes. Further, those responsible for implementing an access restriction or backup strategy—typically, information technology (IT) staff—often should not have access to the contents of an asset for confidentiality reasons, or are unfamiliar with the subject matter of the asset, and are thus unable to rate an asset's criticality. Thus, the illustrative embodiments recognize that there is a need to automatically generate and manage an access restriction for an asset.

The illustrative embodiments recognize that the presently available tools or solutions do not address these needs or provide adequate solutions for these needs. The illustrative embodiments used to describe the invention generally address and solve the above-described problems and other problems related to similarity based digital asset management.

An embodiment can be implemented as a software application. The application implementing an embodiment can be configured as a modification of an existing asset management system, as a separate application that operates in conjunction with an existing asset management system, a standalone application, or some combination thereof.

Particularly, some illustrative embodiments provide a method that detects that an asset is omitted from an asset-specific access policy, scores a criticality of the asset, classifies the asset into a policy category using the criticality score, and applies a selected access policy to the asset.

An embodiment determines whether or not an asset stored on a storage device of a computer system is subject to an asset-specific access policy. An asset-specific asset policy specifies an access restriction of an asset. In one embodiment, an asset restriction specifies which specifically named users or which categories of users (e.g. everyone assigned to Project A, or everyone with a job title of Manager or above) are allowed to read, or both read and modify, an asset. In another embodiment, an asset restriction specifies a geographical location or category of geographic location (e.g. only in the United States or only in European Union countries) in which an asset can be accessed. In one embodiment, an asset-specific asset policy also specifies other measures to be performed for an asset, for example how often the asset is to be backed up, how many replications of the asset are to be generated, and a location or location category in which those replicas are to be stored. For example, copies of an asset critical to the continued functioning of a business might be stored in a set of different physical locations, to ensure continued access to the asset in the event of a natural disaster affecting one of the locations. As another example, data export or privacy laws or regulations, or intellectual property usage agreements, might dictate that a particular asset or category of asset be stored only in a particular country or not be exported to a particular country. One embodiment systematically examines assets stored on a computer system or network of computer systems, independently of any particular access or attempted access to an asset. This systematic examination is also known as crawling. Another embodiment crawls only specified portions of a system or network (e.g. everything except users' private repositories). Another embodiment monitors accesses to stored assets, or a particular category of stored asset, or assets stored in a particular portion of a system or network, and determines access policy status for an asset when it is accessed. Another embodiment determines access policy status for an asset only if an owner of the asset has opted into access policy setting for the asset.

An embodiment scores a criticality of the asset, generating a criticality score measuring how critical or important the asset is. In general, the higher the asset's criticality score, the stricter particular restrictions of the corresponding access policy should be.

An embodiment uses asset metadata, including a utilization history of the asset to compute the asset's criticality score. A utilization history records which users have accessed an asset, at which times, for how long. Because an asset that is used frequently is likely to be more important that an asset that is used less often, one embodiment computes a frequency score based on how frequently the asset has been accessed. Another embodiment computes a frequency score based on how frequently the asset has been accessed within a particular period of time, such as within the past week or month. Computing a frequency score only for a particular period of time takes into account recent usage but not usage longer ago which might no longer be relevant. For example, if a group is using an asset to consolidate preparations for an upcoming conference, the asset is likely to be used frequently until the conference is over, and then only rarely.

An embodiment uses user data recorded in the utilization history of the asset to compute the asset's criticality score. Because an asset that is used by more users is likely to be more important that an asset that is used by fewer users, an embodiment computes a collaboration score based on the number of users who have accessed the asset.

An embodiment uses role data of users recorded in the utilization history of the asset to compute the asset's criticality score. An asset used by users in more business-critical roles (e.g. users with titles of Manager or above, or Vice President or above) is likely to be more critical to the business than an asset used by users in less business-critical roles. Similarly, an asset used by users in some roles (e.g. users in legal or human resources departments who often deal with confidential data) is likely to be more confidential, and thus more in need of protection, than an asset used by users in other roles. Thus, an embodiment computes, as a role score, the fraction of total asset users with a particular role or set of roles.

An embodiment analyzes an asset's content to compute the asset's criticality score. One embodiment analyzes an asset's content to determine a topic of the asset. Another embodiment analyzes an asset's content to determine whether one or more keywords indicative of an asset's criticality are present. Some non-limiting examples of keywords indicative of an asset's criticality are "confidential" and "secret". Techniques for extracting keywords and determining a topic of many types of assets are presently known. One embodiment uses a natural language processing engine and a Latent Dirichlet Allocation analysis on words or other textual units of natural language text to extract keywords and determine one or more topics discussed in the text. Another embodiment uses a natural language processing engine and a term frequency—inverse document frequency based analysis to extract keywords from natural language text and score the keywords' significance. Techniques are also presently known to analyze still images, video and audio content (e.g., using a combination of image analysis and audio to natural language text conversion followed by natural language text analysis), source code, structured representations of text, and other asset forms. An embodiment assigns a topic category and corresponding topic score to the asset based on an identified topic or keywords. One embodiment maintains a list of topics and corresponding categories/scores. For example, an asset with a topic of salary information might be classified into a most critical category and assigned a score of 0.9 on a 0-1 scale, while an asset with a topic of pre-conference planning might be classified into a medium critical category and assigned a score of 0.5 on the same 0-1 scale and an asset with a topic of users' preferred lunch orders might be classified into a least critical category and assigned a score of 0.1 on a 0-1 scale. Another embodiment uses a trained topic classification model to assign an asset's topic to a corresponding category and score.

An embodiment uses asset metadata including natural language comment data of the asset to compute the asset's criticality score. In one embodiment, natural language comment data of the asset is stored with the asset itself. Another embodiment retrieves natural language comment data regarding the asset from another source, such as an internal communications archive of the business. Comment data might describe the asset, a modification to the asset, or include other data that might be helpful in determining a criticality score of an asset. Thus, an embodiment uses a natural language processing engine, a trained topic classification model, or another presently known technique to analyze and categorize the comment data, then assign a comment score corresponding to the assigned category.

An embodiment uses asset metadata including a manual score, received from a user, to compute the asset's criticality score. The manual score is a user's assessment of the asset's criticality.

An embodiment combines one or more of the frequency score, collaboration score, role score, topic score, comment data score, and manual score into the asset's criticality score. One embodiment computes the criticality score by normalizing one or more of the frequency score, collaboration score, role score, topic score, comment data score, and manual score to a common scale (e.g. 0-1, 0-10, or 0-100) and computing a weighted average of the normalized scores.

An embodiment uses a criticality score of an asset to classify the asset into a policy category. One embodiment divides the range of scores into segments, and assigns an asset to one of the segments based on the asset's criticality score. For example, if the embodiment uses three segments, assets with scores from 0 to 0.33 are assigned to policy category A, assets with scores from 0.34 to 0.66 are assigned to policy category B, and assets with scores from 0.67 to 1 are assigned to policy category C. Other numbers of categories and segments of an unequal size are also possible and contemplated within the scope of the illustrative embodiments.

An embodiment selects an access policy from a set of access policies assigned to assets in the same policy category as the asset. One embodiment selects the strictest access policy from a set of access policies assigned to assets in the same policy category as the asset. To select the strictest access policy, the embodiment initializes a current policy to a default policy applicable to every asset. Then the embodiment determines whether an asset-specific asset policy has already been assigned to one or more assets in the same policy category as the asset. If an asset-specific asset policy has already been assigned to one of the other assets, and is in a higher category (hence, stricter) than the asset's current policy, one embodiment assigns the higher-category asset policy to the asset for which a policy is currently being determined. Another embodiment assigns the higher-category asset policy to all of the assets in the cluster.

An embodiment applies the selected access policy to the asset. Once the selected access policy is applied, an embodiment allows or disallows access to the asset according to an access restriction specified in the access policy. Thus, if an access restriction specifies which specifically named users or which categories of users are allowed to access the asset, or which specifically named users or which categories of users are allowed to modify the asset, only those named users or categories of users are allowed to access or modify the asset. As well, if an asset-specific asset policy also specifies other measures to be performed for an asset, such as how often the asset is to be backed up, how many replications of the asset are to be generated, or a location or location category in which those replicas are to be stored, an embodiment implements the specified measures for the asset.

At a later time, after initially applying an asset policy to an asset, an embodiment scores an updated criticality of the asset, uses the updated criticality score to classify the asset into an updated policy category, selects an updated access policy based on the updated policy category, and applies the updated access policy to the asset in a manner described herein. An asset's criticality might change over time. For example, a pre-conference planning document might become less critical once the conference is over. If an asset policy is modified, an embodiment applies the modified asset policy to the assets subject to the modified asset policy.

The manner of similarity based digital asset management described herein is unavailable in the presently available methods in the technological field of endeavor pertaining to digital asset management. A method of an embodiment described herein, when implemented to execute on a device or data processing system, comprises substantial advancement of the functionality of that device or data processing system in detecting that an asset is omitted from an asset-specific access policy, scoring a criticality of the asset, classifying the asset into a policy category using the criticality score, and applying a selected access policy to the asset.

The illustrative embodiments are described with respect to certain types of assets, policies, restrictions, categories, roles, scores, periods, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
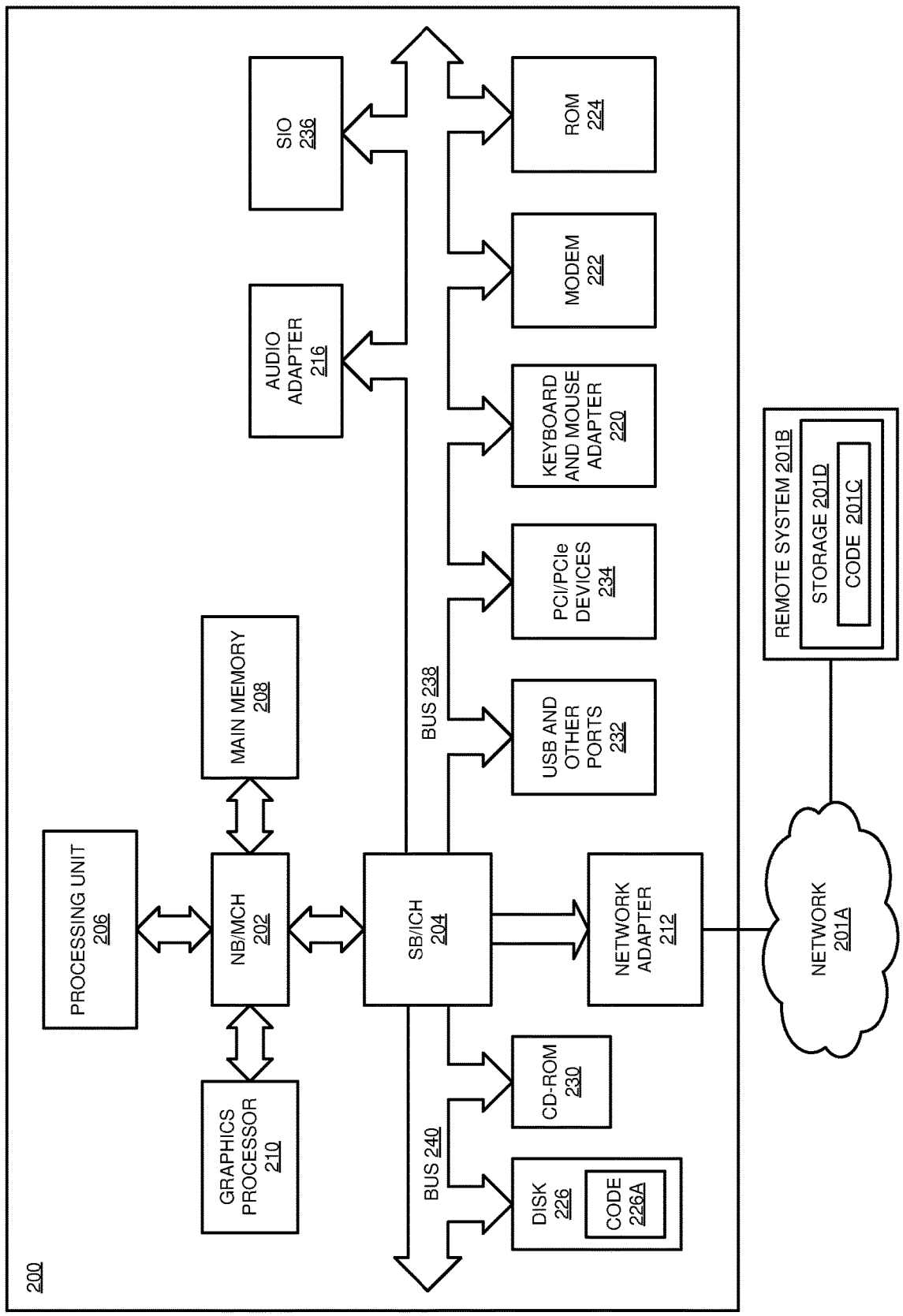
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 applies an access policy to an asset stored in any of servers 104 and 106, clients 110, 112, and 114, device 132, and storage unit 108.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
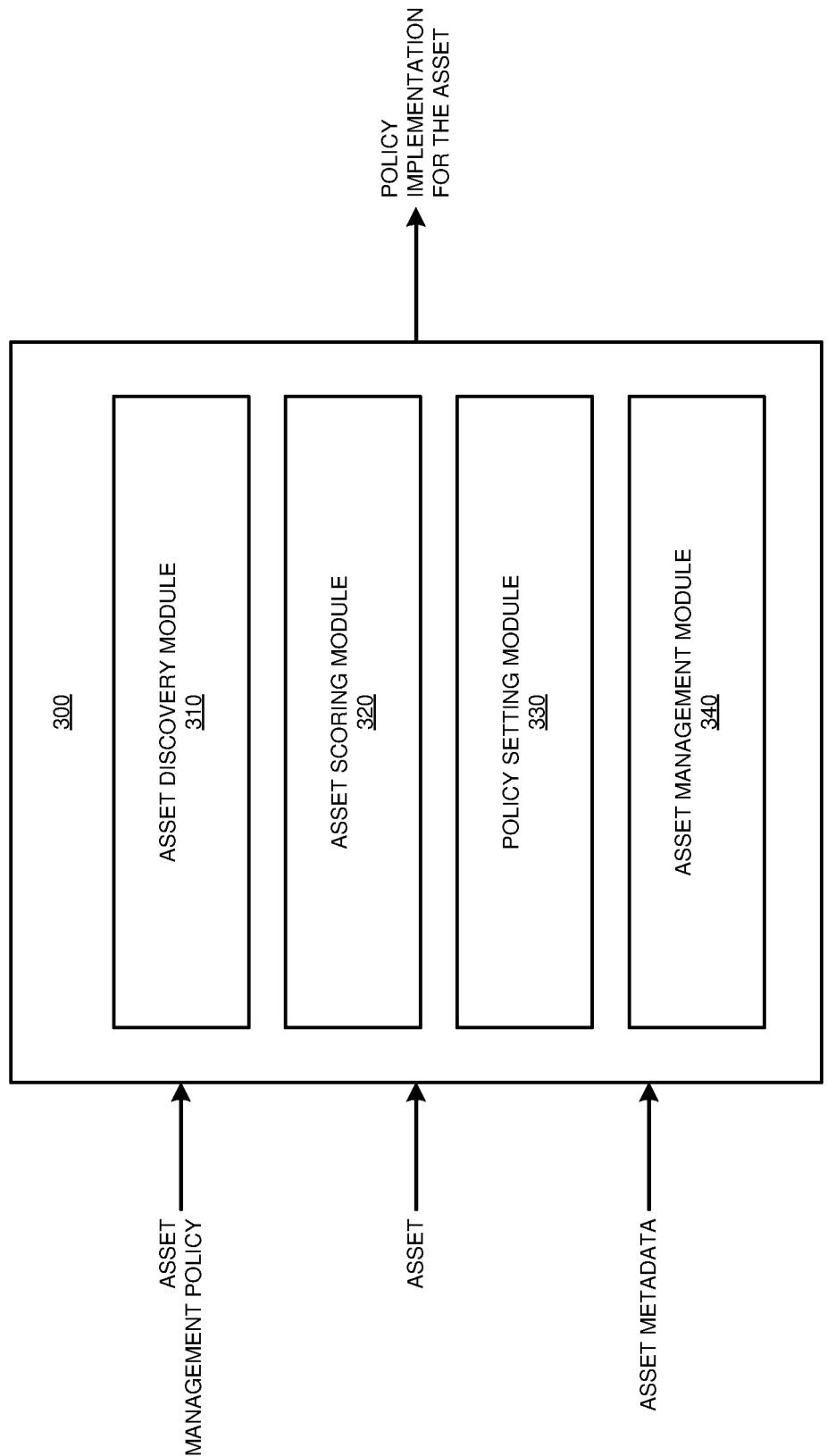
FIG. 3 depicts a block diagram of an example configuration for similarity based digital asset management in accordance with an illustrative embodiment.

With reference to FIG. 3, this figure depicts a block diagram of an example configuration for similarity based digital asset management in accordance with an illustrative embodiment. Application 300 is an example of application 105 in FIG. 1 and executes in any of servers 104 and 106, clients 110, 112, and 114, and device 132 in FIG. 1.

Asset discovery module 310 determines whether or not an asset stored on a storage device of a computer system is subject to an asset-specific access policy. An asset-specific access policy specifies an access restriction of an asset, including which specifically named users or which categories of users are allowed to read, or both read and modify, an asset, or specifies a geographical location or category of geographic location in which an asset can be accessed. In one implementation of module 310, an asset-specific access policy also specifies other measures to be performed for an asset, for example how often the asset is to be backed up, how many replications of the asset are to be generated, and a location or location category in which those replicas are to be stored.

One implementation of module 310 systematically examines assets stored on a computer system or network of computer systems, independently of any particular access or attempted asset to an asset. Another implementation of module 310 crawls only specified portions of a system or network (e.g. everything except users' private repositories). Another implementation of module 310 monitors accesses to stored assets, or a particular category of stored asset, or assets stored in a particular portion of a system or network, and determines access policy status for an asset when it is accessed. Another implementation of module 310 determines access policy status for an asset only if an owner of the asset has opted into access policy setting for the asset.

Asset scoring module 320 scores a criticality of the asset, generating a criticality score measuring how critical or important the asset is. In general, the higher the asset's criticality score, the stricter particular restrictions of the corresponding access policy should be.

Asset scoring module 320 uses asset metadata, including a utilization history of the asset, user data and user role data recorded in the utilization history, natural language comment data, and a manual score, to compute the asset's criticality score. Asset scoring module 320 also analyzes an asset's content to compute the asset's criticality score. In particular, module 320 combines one or more of a frequency score, collaboration score, role score, topic score, comment data score, and manual score into the asset's criticality score. One implementation of module 320 computes the criticality score by normalizing one or more of the frequency score, collaboration score, role score, topic score, comment data score, and manual score to a common scale (e.g. 0-1, 0-10, or 0-100) and computing a weighted average of the normalized scores.

Policy setting module 330 uses a criticality score of an asset to classify the asset into a policy category. One implementation of module 330 divides the range of scores into segments, and assigns an asset to one of the segments based on the asset's criticality score. Module 330 selects an access policy from a set of access policies assigned to assets in the same policy category as the asset. One implementation of module 330 selects the strictest access policy from a set of access policies assigned to assets in the same policy category as the asset. To select the strictest access policy, module 330 initializes a current policy to a default policy applicable to every asset. Then module 330 determines whether an asset-specific asset policy has already been assigned to one or more assets in the same policy category as the asset. If an asset-specific asset policy has already been assigned to one of the other assets, and is in a higher category (hence, stricter) than the asset's current policy, one implementation of module 330 assigns the higher-category asset policy to the asset for which a policy is currently being determined. Another implementation of module 330 assigns the higher-category asset policy to all of the assets in the cluster.

Asset management module 340 applies the selected access policy to the asset. Once the selected access policy is applied, module 340 allows or disallows access to the asset according to an access restriction specified in the access policy. Thus, if an access restriction specifies which specifically named users or which categories of users are allowed to access the asset, or which specifically named users or which categories of users are allowed to modify the asset, only those named users or categories of users are allowed to access or modify the asset. As well, if an asset-specific asset policy also specifies other measures to be performed for an asset, such as how often the asset is to be backed up, how many replications of the asset are to be generated, or a location or location category in which those replicas are to be stored, module 340 implements the specified measures for the asset.

At a later time, after initially applying an asset policy to an asset, application 300 scores an updated criticality of the asset, uses the updated criticality score to classify the asset into an updated policy category, selects an updated access policy based on the updated policy category, and applies the updated access policy to the asset in a manner described herein. If an asset policy is modified, module 340 applies the modified asset policy to the assets subject to the modified asset policy.

Figure 4:
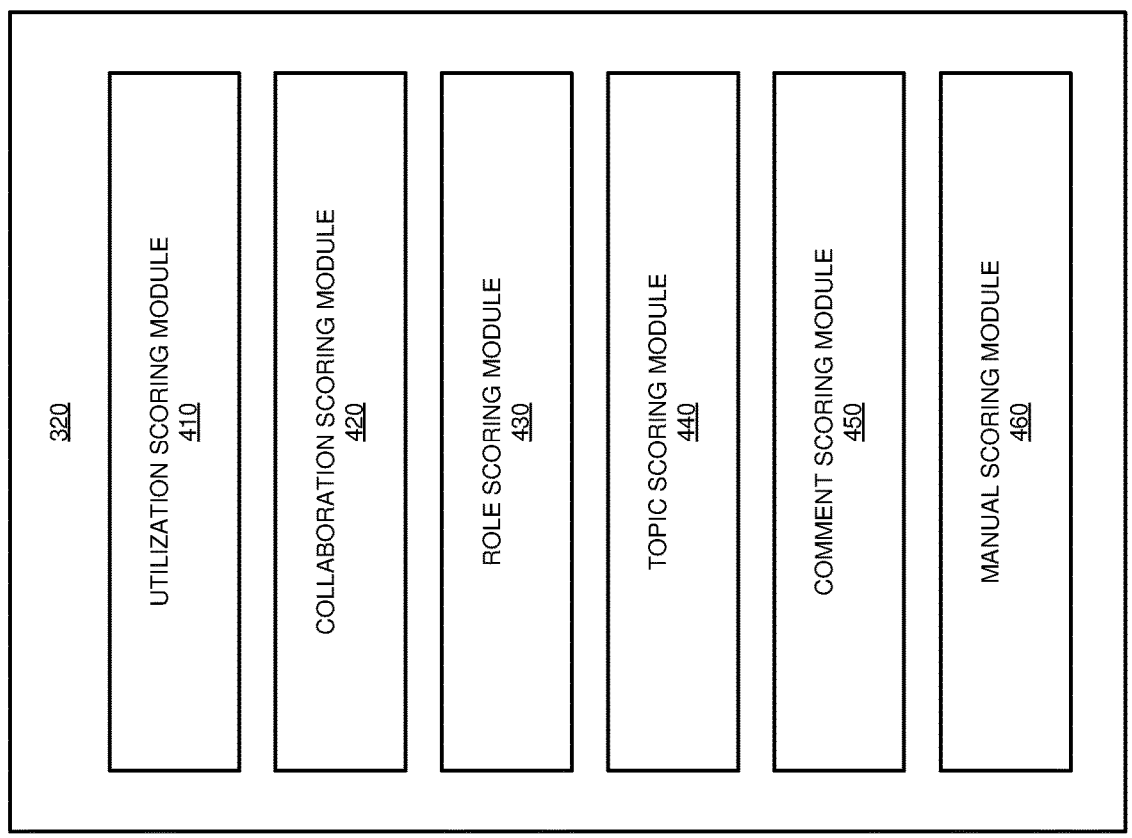
FIG. 4 depicts a block diagram of an example configuration for similarity based digital asset management in accordance with an illustrative embodiment.

With reference to FIG. 4, this figure depicts a block diagram of an example configuration for similarity based digital asset management in accordance with an illustrative embodiment. In particular, FIG. 4 depicts more detail of asset scoring module 320 in FIG. 3.

Utilization scoring module 410 uses asset metadata, including a utilization history of the asset to compute the asset's criticality score. A utilization history records which users have accessed an asset, at which times, for how long. Because an asset that is used frequently is likely to be more important that an asset that is used less often, one implementation of module 410 computes a frequency score based on how frequently the asset has been accessed. Another implementation of module 410 computes a frequency score based on how frequently the asset has been accessed within a particular period of time, such as within the past week or month.

Collaboration scoring module 420 uses user data recorded in the utilization history of the asset to compute the asset's criticality score. Because an asset that is used by more users is likely to be more important that an asset that is used by fewer users, module 420 computes a collaboration score based on the number of users who have accessed the asset.

Role scoring module 430 uses role data of users recorded in the utilization history of the asset to compute the asset's criticality score. In particular, module 430 computes, as a role score, the fraction of total asset users with a particular role or set of roles.

Topic scoring module 440 analyzes an asset's content to determine a topic of the asset, or determine whether one or more keywords indicative of an asset's criticality are present. One implementation of module 440 uses a natural language processing engine and a Latent Dirichlet Allocation analysis on words or other textual units of natural language text to extract keywords and determine one or more topics discussed in the text. Another implementation of module 440 uses a natural language processing engine and a term frequency—inverse document frequency based analysis to extract keywords from natural language text and score the keywords' significance. Another implementation of module 440 analyzes still images, video and audio content, source code, structured representations of text, and other asset forms. Module 440 assigns a topic category and corresponding topic score to the asset based on an identified topic or keywords. One implementation of module 440 maintains a list of topics and corresponding categories/scores. Another implementation of module 440 uses a trained topic classification model to assign an asset's topic to a corresponding category and score.

Comment scoring module 450 uses asset metadata including natural language comment data of the asset to compute the asset's criticality score. In one implementation of module 450, natural language comment data of the asset is stored with the asset itself. Another implementation of module 450 retrieves natural language comment data regarding the asset from another source, such as an internal communications archive of the business. Comment data might describe the asset, a modification to the asset, or include other data that might be helpful in determining a criticality score of an asset. Thus, module 450 uses a natural language processing engine, a trained topic classification model, or another presently known technique to analyze and categorize the comment data, then assign a comment score corresponding to the assigned category.

Manual scoring module 460 uses asset metadata including a manual score, received from a user, to compute the asset's criticality score. The manual score is a user's assessment of the asset's criticality.

Figure 5:
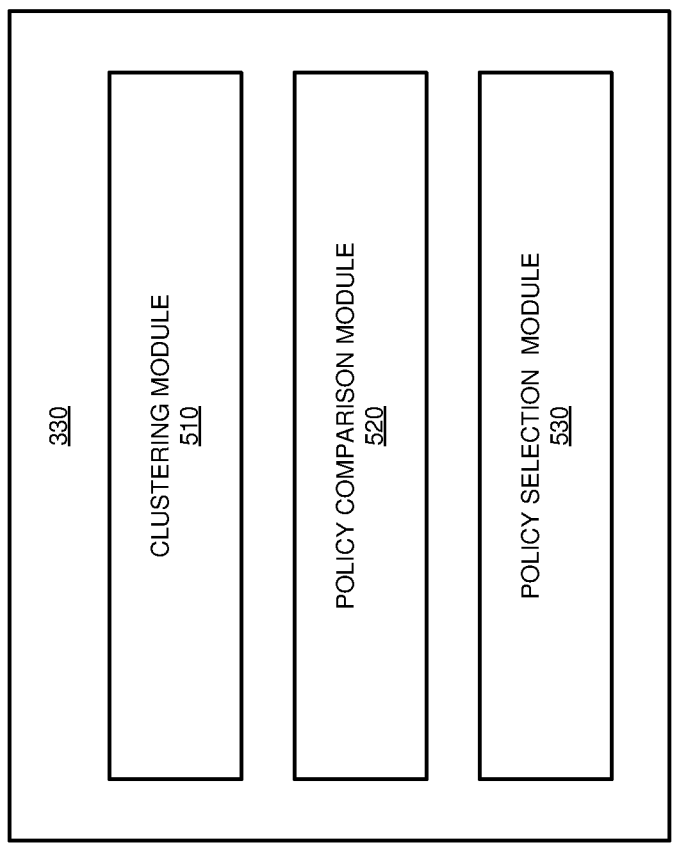
FIG. 5 depicts a block diagram of an example configuration for similarity based digital asset management in accordance with an illustrative embodiment.

With reference to FIG. 5, this figure depicts a block diagram of an example configuration for similarity based digital asset management in accordance with an illustrative embodiment. In particular, FIG. 5 depicts more detail of policy setting module 330 in FIG. 3.

Clustering module 510 uses a criticality score of an asset to classify the asset into a policy category. One implementation of module 510 divides the range of scores into segments, and assigns an asset to one of the segments based on the asset's criticality score. Policy comparison module 520 initializes a current policy to a default policy applicable to every asset. Then module 520 determines whether an asset-specific asset policy has already been assigned to one or more assets in the same policy category as the asset. If an asset-specific asset policy has already been assigned to one of the other assets, and is in a higher category (hence, stricter) than the asset's current policy, one implementation of policy selection module 530 assigns the higher-category asset policy to the asset for which a policy is currently being determined. Another implementation of module 530 assigns the higher-category asset policy to all of the assets in the cluster.

Figure 6:
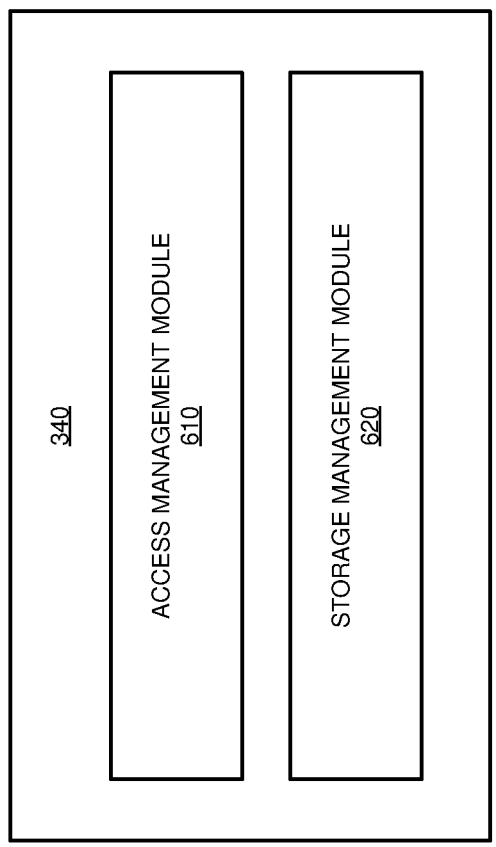
FIG. 6 depicts a block diagram of an example configuration for similarity based digital asset management in accordance with an illustrative embodiment.

With reference to FIG. 6, this figure depicts a block diagram of an example configuration for similarity based digital asset management in accordance with an illustrative embodiment. In particular, FIG. 6 depicts more detail of asset management module 340 in FIG. 3.

Access management module 610 allows or disallows access to the asset according to an access restriction specified in the access policy. Thus, if an access restriction specifies which specifically named users or which categories of users are allowed to access the asset, or which specifically named users or which categories of users are allowed to modify the asset, only those named users or categories of users are allowed to access or modify the asset. As well, if an asset-specific asset policy also specifies other measures to be performed for an asset, such as how often the asset is to be backed up, how many replications of the asset are to be generated, or a location or location category in which those replicas are to be stored, storage management module 620 implements the specified measures for the asset.

Figure 7:
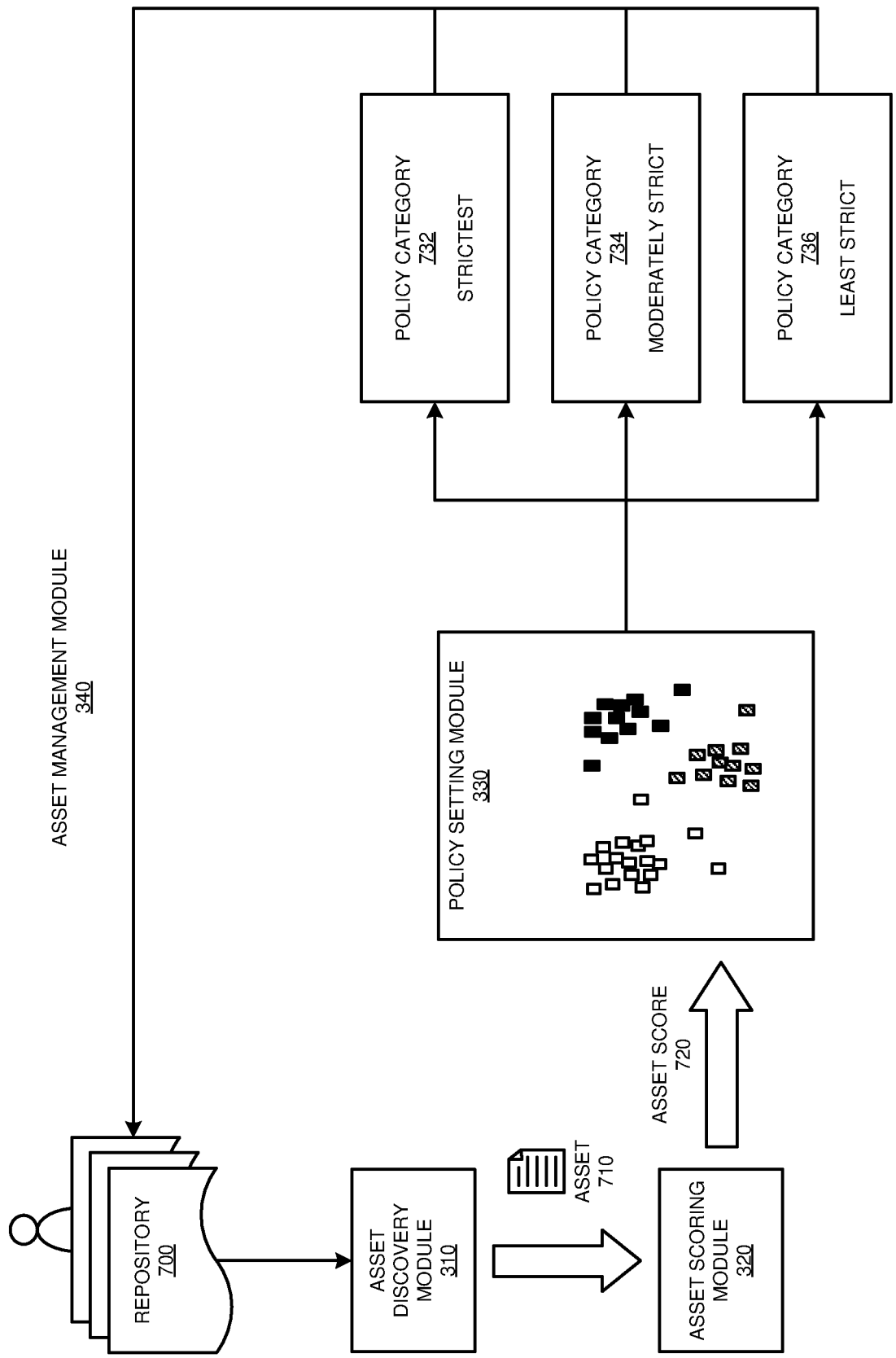
FIG. 7 depicts an example of similarity based digital asset management in accordance with an illustrative embodiment.

With reference to FIG. 7, this figure depicts an example of similarity based digital asset management in accordance with an illustrative embodiment. The example can be executed using application 300 in FIG. 3. Asset discovery module 310, asset scoring module 320, and policy setting module 330 are the same as asset discovery module 310, asset scoring module 320, and policy setting module 330 in FIG. 3.

Asset discovery module 310 crawls repository 700 and discovers asset 710, stored in repository 700. Asset scoring module 320 scores a criticality of asset 710, generating asset score 720, a criticality score measuring how critical or important asset 710 is. Policy setting module 330 uses asset score 720 to classify asset 710 into one of policy categories 732, 734, and 736, and selects an access policy from a set of access policies assigned to assets in the same policy category as asset 710.

Figure 8:
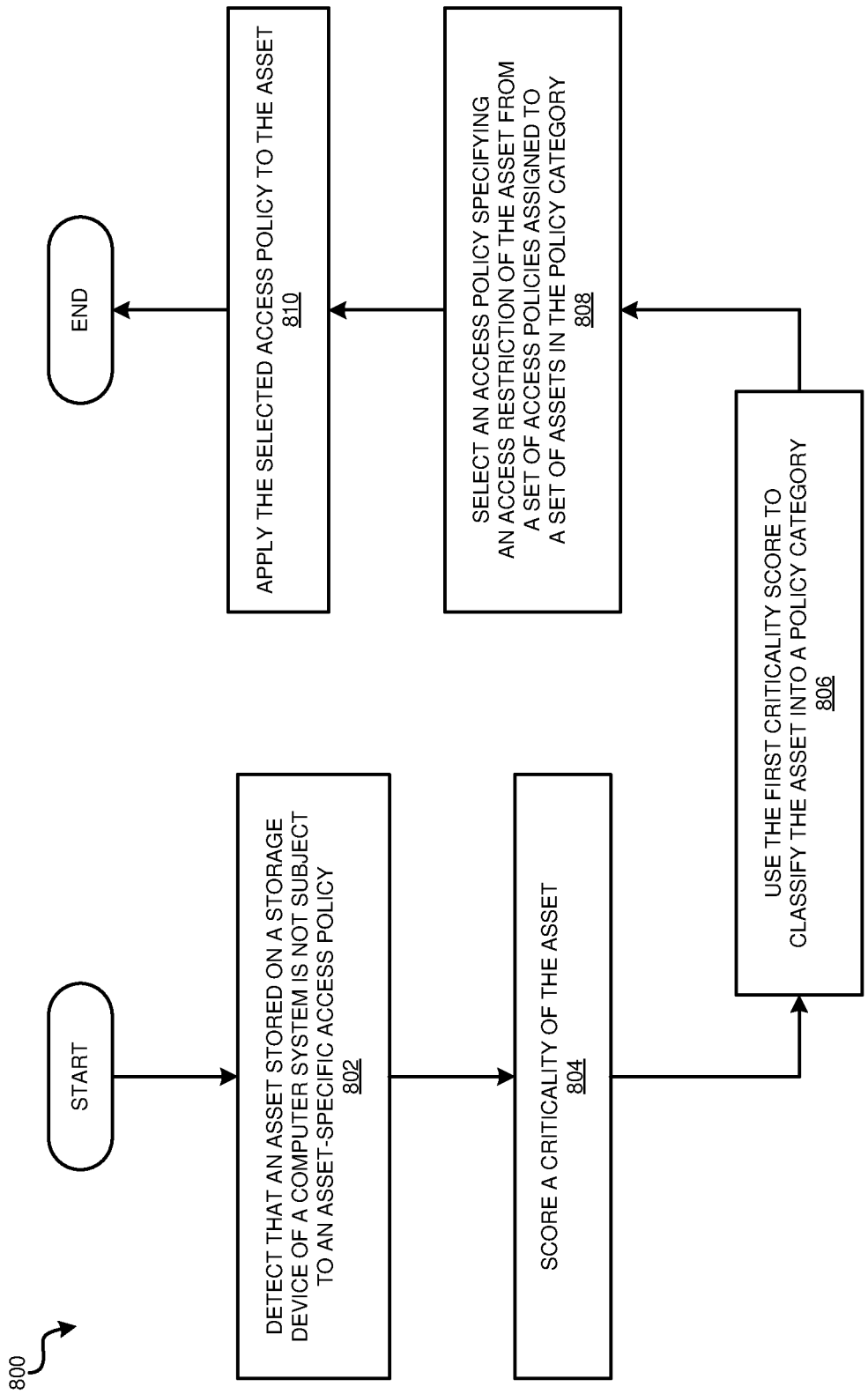
FIG. 8 depicts a flowchart of an example process for similarity based digital asset management in accordance with an illustrative embodiment.

With reference to FIG. 8, this figure depicts a flowchart of an example process for similarity based digital asset management in accordance with an illustrative embodiment. Process 800 can be implemented in application 300 in FIG. 3.

In block 802, the application detects that an asset stored on a storage device of a computer system is not subject to an asset-specific access policy. In block 804, the application scores a criticality of the asset. In block 806, the application uses the first criticality score to classify the asset into a policy category. In block 808, the application selects an access policy specifying an access restriction of the asset from a set of access policies assigned to a set of assets in the policy category. In block 810, the application applies the selected access policy to the asset. Then the application ends.

Figure 9:
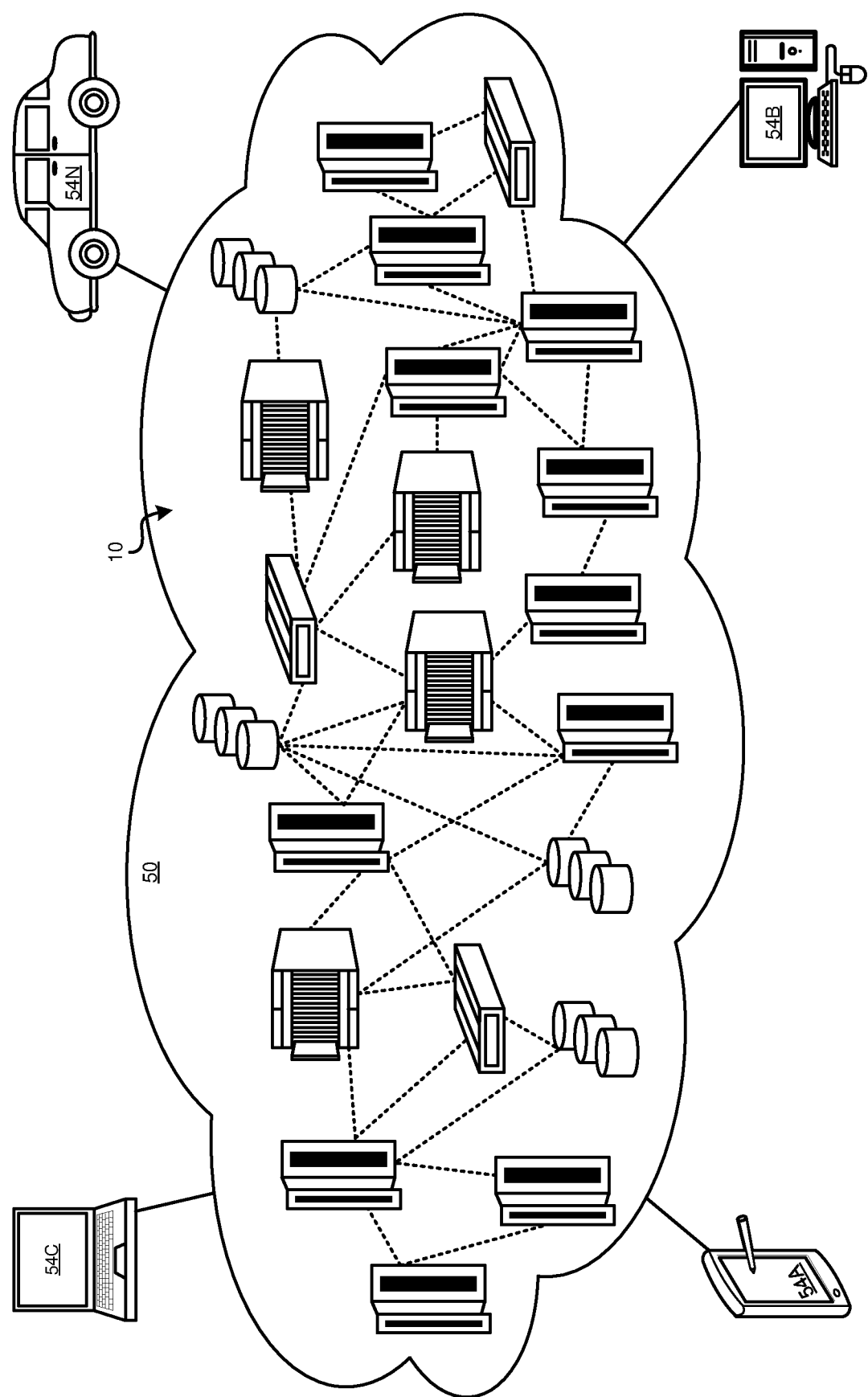
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
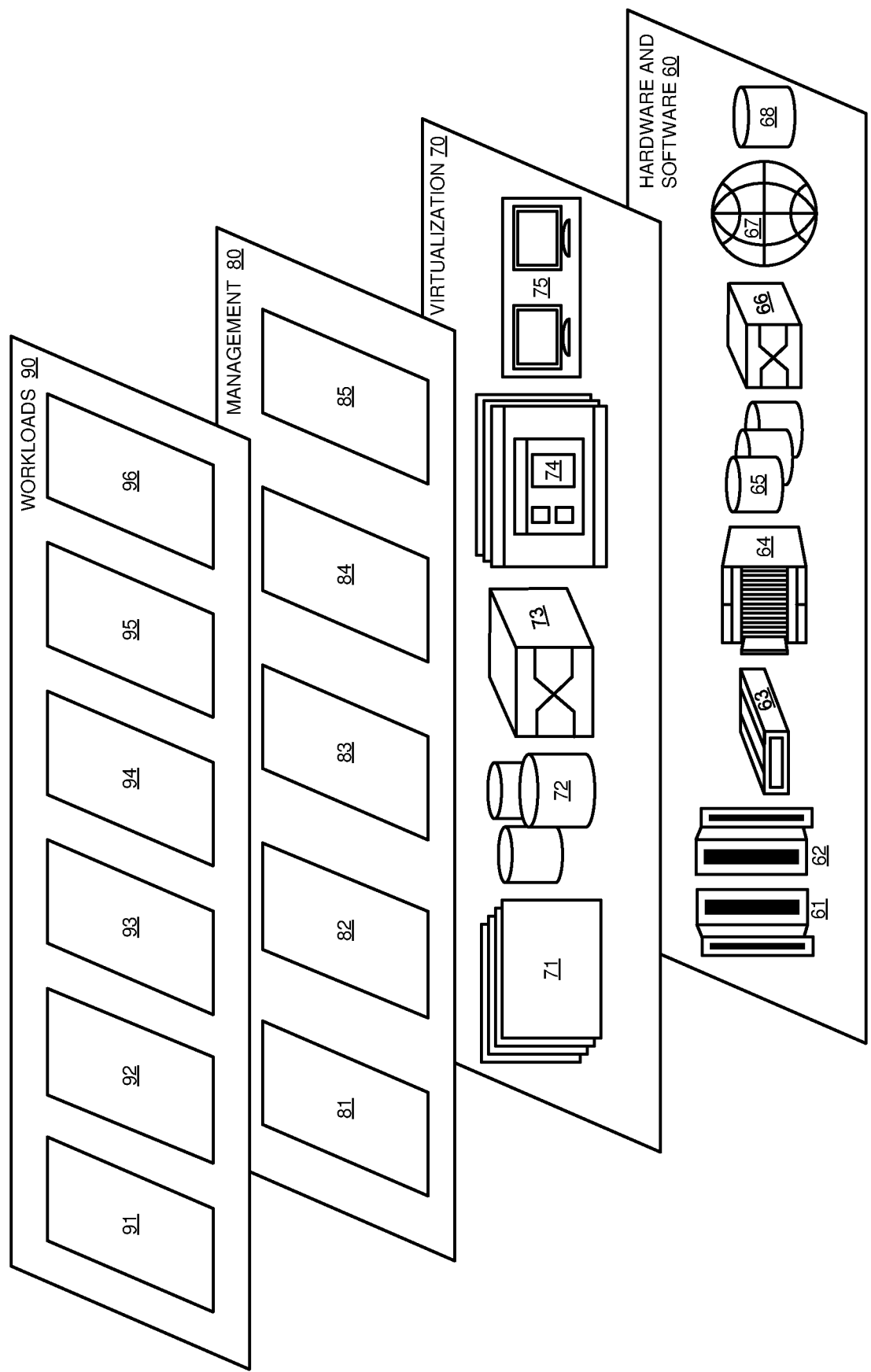
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for similarity based digital asset management and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    detecting that an asset stored on a storage device of a computer system is omitted from an asset-specific access policy by a systematic examination comprising a crawling process over specified portions of a system or network to discover where the asset is stored;
    scoring, using metadata including a utilization history of the asset, a criticality of the asset, the scoring comprising generating a first criticality score for the asset;
    classifying, using the first criticality score, the asset into a policy category;
    applying, to the asset, a selected access policy, the selected access policy selected from a set of access policies assigned to a set of assets in the policy category, the selected access policy specifying an access restriction of the asset including allowing access to the asset which includes at least one of allowing the asset to be read, or both read and modified by specifically named users or categories of users and specifying a geographical location or category of geographic location in which the asset can be accessed, and
    performing measures on the asset that are critical to a business' continued operations including backing up the asset, how often the asset is backed up, how many replications of the asset are to be generated, and providing a location or location category in which the replicas are to be stored and for the asset thereby ensuring the asset remains accessible.

2. The computer-implemented method of claim 1, further comprising:
    scoring, using a collaboration history of the asset, the criticality of the asset.

3. The computer-implemented method of claim 1, further comprising:
    scoring, using user role data recorded in the utilization history of the asset, the criticality of the asset.

4. The computer-implemented method of claim 1, further comprising:
    scoring, using a topic of the asset determined using a natural language processing engine, the criticality of the asset.

5. The computer-implemented method of claim 1, further comprising:
    scoring, using natural language comment data of the asset, the criticality of the asset, the natural language comment data extracted using a natural language processing engine and classified using a trained topic classification model.

6. The computer-implemented method of claim 1, further comprising:
    allowing, according to the access restriction, access to the asset.

7. The computer-implemented method of claim 1, further comprising:
    disallowing, according to the access restriction, access to the asset.

8. The computer-implemented method of claim 1, further comprising:
    replicating, according to the selected access policy, the asset, the replicated asset stored on a second storage device separate from the storage device.

9. The computer-implemented method of claim 1, further comprising:
    scoring, at a second time, an updated criticality of the asset, the scoring comprising generating an updated criticality score of the asset;
    classifying, using the updated criticality score, the asset into an updated policy category; and
    applying, to the asset, responsive to determining that the updated policy category differs from the policy category, an updated selected access policy, the updated selected access policy selected from a second set of access policies assigned to a second set of assets in the updated policy category.

10. A computer program product for digital asset management, the computer program product comprising:
    one or more computer readable storage media, and program instructions collectively stored on the one or more computer readable storage media, the program instructions comprising:
    program instructions to detect that an asset stored on a storage device of a computer system is omitted from an asset-specific access policy by a systematic examination comprising a crawling process over specified portions of a system or network to discover where the asset is stored;
    program instructions to score, using metadata including a utilization history of the asset, a criticality of the asset, the scoring comprising generating a first criticality score for the asset;
    program instructions to classify, using the first criticality score, the asset into a policy category;
    program instructions to apply, to the asset, a selected access policy, the selected access policy selected from a set of access policies assigned to a set of assets in the policy category, the selected access policy specifying an access restriction of the asset including allowing access to the asset which includes at least one of allowing the asset to be read, or both read and modified by specifically named users or categories of users and specifying a geographical location or category of geographic location in which the asset can be accessed, and
    program instructions to perform measures on the asset that are critical to a business' continued operations including backing up the asset, how often the asset is backed up, how many replications of the asset are to be generated, and providing a location or location category in which the replicas are to be stored and for the asset thereby ensuring the asset remains accessible.

11. The computer program product of claim 10, the stored program instructions further comprising:
    program instructions to score, using a collaboration history of the asset, the criticality of the asset.

12. The computer program product of claim 10, the stored program instructions further comprising:

program instructions to score, using user role data recorded in the utilization history of the asset, the criticality of the asset.

13. The computer program product of claim 10, the stored program instructions further comprising:
program instructions to score, using a topic of the asset determined using a natural language processing engine, the criticality of the asset.

14. The computer program product of claim 10, the stored program instructions further comprising:
program instructions to score, using natural language comment data of the asset, the criticality of the asset, the natural language comment data extracted using a natural language processing engine and classified using a trained topic classification model.

15. The computer program product of claim 10, the stored program instructions further comprising:
program instructions to allow, according to the access restriction, access to the asset.

16. The computer program product of claim 10, the stored program instructions further comprising:
program instructions to disallow, according to the access restriction, access to the asset.

17. The computer program product of claim 10, wherein the stored program instructions are stored in the at least one of the one or more storage media of a local data processing system, and wherein the stored program instructions are transferred over a network from a remote data processing system.

18. The computer program product of claim 10, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 10, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to detect that an asset stored on a storage device of a computer system is omitted from an asset-specific access policy by a systematic examination comprising a crawling process over specified portions of a system or network to discover where the asset is stored;
program instructions to score, using metadata including a utilization history of the asset, a criticality of the asset, the scoring comprising generating a first criticality score for the asset;
program instructions to classify, using the first criticality score, the asset into a policy category;
program instructions to apply, to the asset, a selected access policy, the selected access policy selected from a set of access policies assigned to a set of assets in the policy category, the selected access policy specifying an access restriction of the asset including allowing access to the asset which includes at least one of allowing the asset to be read, or both read and modified by specifically named users or categories of users and specifying a geographical location or category of geographic location in which the asset can be accessed, and
program instructions to perform measures on the asset that are critical to a business' continued operations including backing up the asset, how often the asset is backed up, how many replications of the asset are to be generated, and providing a location or location category in which the replicas are to be stored and for the asset thereby ensuring the asset remains accessible.

\* \* \* \* \*